United States Patent [19]

Mehta

[11] Patent Number: 4,723,962
[45] Date of Patent: Feb. 9, 1988

[54] PROCESS FOR RECOVERING LITHIUM FROM SALT BRINES

[75] Inventor: Vijay C. Mehta, Gastonia, N.C.

[73] Assignee: Lithium Corporation of America, Gastonia, N.C.

[21] Appl. No.: 873,099

[22] Filed: Jun. 5, 1986

Related U.S. Application Data

[63] Continuation of Ser. No. 697,745, Feb. 4, 1985, abandoned.

[51] Int. Cl.$^4$ .................. B01D 9/00; B01D 9/02; C01D 15/00; C01D 15/06
[52] U.S. Cl. ..................... 23/302 R; 23/304; 23/296; 23/300; 23/298; 23/295 S; 23/295 R; 423/179.5; 423/551
[58] Field of Search ................... 23/295 R, 295 S, 296, 23/298, 300, 302 R, 304; 423/179.5, 551

[56] References Cited

U.S. PATENT DOCUMENTS

| | | | |
|---|---|---|---|
| 876,851 | 1/1908 | Wadman | 423/551 |
| 1,623,513 | 4/1927 | Weidmann | 423/179.5 |
| 3,268,289 | 8/1966 | Macey | 423/179.5 |
| 3,306,700 | 2/1967 | Neipert et al. | 423/179.5 |
| 3,537,813 | 11/1970 | Nelli et al. | 423/179.5 |
| 4,036,713 | 7/1977 | Brown | 204/98 |
| 4,243,392 | 1/1981 | Brown et al. | 23/295 S |
| 4,271,131 | 6/1981 | Brown et al. | 423/179.5 |
| 4,274,834 | 6/1981 | Brown et al. | 423/179.5 |
| 4,287,163 | 9/1981 | Garrett et al. | 423/179.5 |

FOREIGN PATENT DOCUMENTS 31513 6/1980 Chile .
33867 9/1983 Chile .

OTHER PUBLICATIONS

Garrett and Laborde (1980), *Salting Out Process for Lithium Recovery*.
Badilla et al. (1981), *Obtaining Sulfate from Brines from the Atcama Salt Deposit–Final Study Report*.
Ramirez, R. S., *Process for Recovering Lithium Sulfate*, Variation A and Variation B.
"Process for Precipitation (Salting Out) to Retrieve Lithium", Martin Laborde E., Corporacion de Fomento de la Produccion, Santiago, Chile.
Ramirez, R. S., "Process for Obtaining Magnesium Sulfate", Variation B, (1979) (English translation).
D. Kaplan, Process for the Extraction of Lithium from Dead Sea Solutions, *Israel J. Chem.*, vol. 1, 1963.
R. L. Nielsen and M. G. Herre: Lithium and its Compounds, *Ind. and Engineering Chemistry*, vol. 43, No. 12, Dec. 1951.
Anon., "Silver Peak Gives Bright Look to Foote Mineral's Lithium Picture", *E/MJ*, Apr. 1970, pp. 71–73.
Anon., "Utah Company Gets Set Up to Tap Mineral Wealth of Great Salt Lake", *E/MJ*, Apr. 1970, pp. 67–70.
J. A. Epstein, E. M. Fesit, and J. Zmora: Extraction of Lithium from Dead Sea, *Hydrometallurgy*, vol. 6, pp. 269–275, 1981, Elsevier Scientific Publishing Co., Amsterdam.
W. A. Averill and David L. Olson: A Review of Extractive Processes for Lithium from Ores and Brines, *Energy*, vol. 3, pp. 305—313, 1975, Pergamon Press Ltd.
G. G. Gabra and A. E. Torma: Lithium Chloride Extraction by N-Butanol, *Hydrometallurgy*, pp. 23–33, 1978, Elsevier Publishing Co., Amsterdam.

*Primary Examiner*—Andrew H. Metz
*Assistant Examiner*—Chung K. Pak
*Attorney, Agent, or Firm*—Banner, Birch, McKie and Beckett

[57] ABSTRACT

An improved process is described for recovering lithium from evaporatively concentrated brines. Epsom salt recovered from the brine at about 0° C. is added to the concentrated lithium-containing brine, so as to precipitate lithium sulfate monohydrate, the brine having previously been subjected to the sequential steps of two stage chilling, evaporative concentration, further chilling and vacuum evaporation.

6 Claims, 1 Drawing Figure

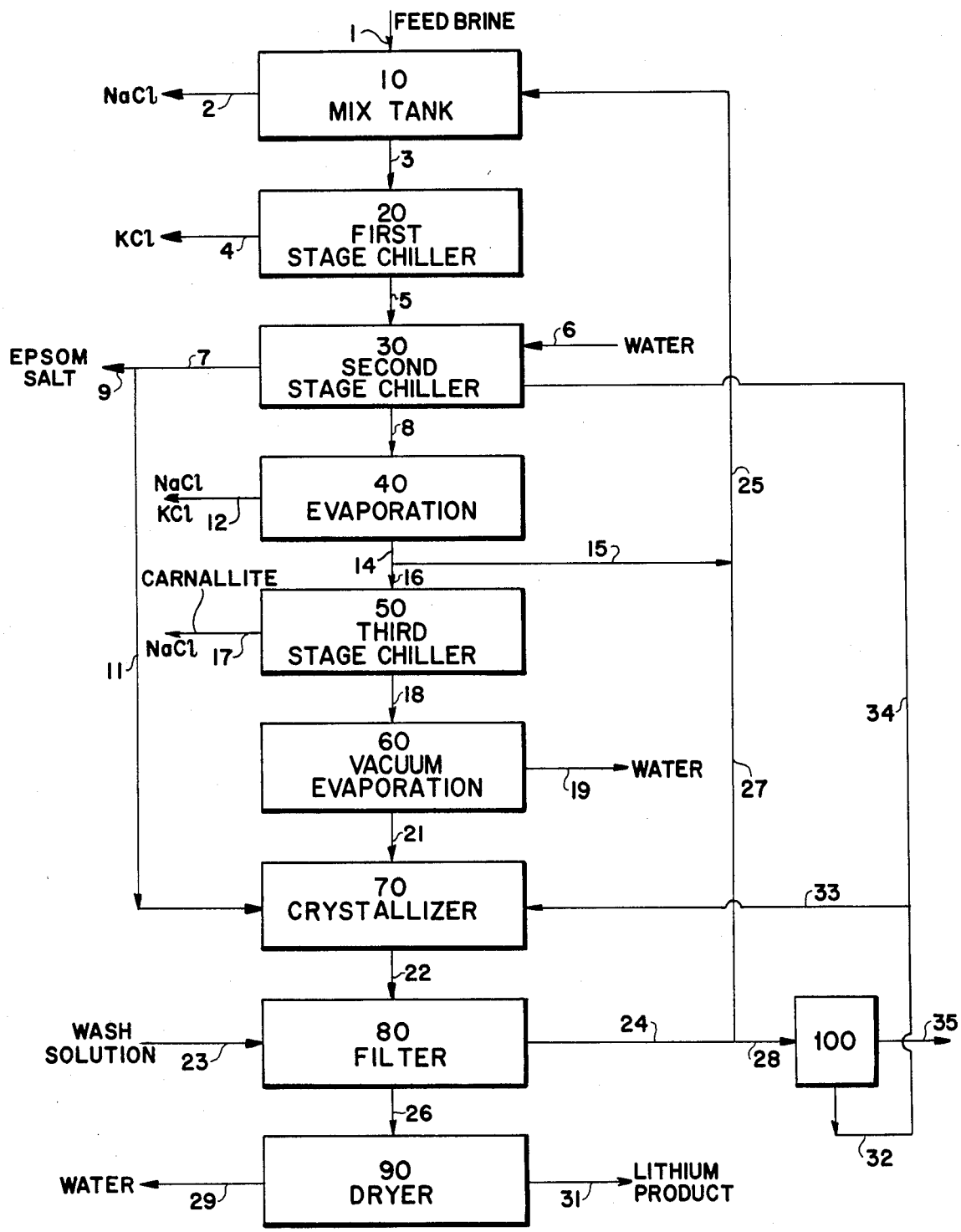

PROCESS FOR RECOVERING LITHIUM FROM SALT BRINES

This application is a continuation of application Ser. No. 697,745, filed Feb. 4, 1985, now abandoned.

BACKGROUND OF THE INVENTION

1. Field of the Invention

The present invention relates to a method for economically recovering lithium from complex brines containing a significant amount of sulfate, so as to maximize the recovery of lithium values. The present invention particularly pertains to an improved process for recovering lithium sulfate monohydrate from a brine.

2. Description of the Prior Art

A number of naturally occurring brines contain, at least in the commercial sense, a significant quantity of lithium values. The lithium values of some natural brines, such as for example, those found in Clayton Valley, Nev. can conveniently be recovered as precipitated lithium carbonate by standard treatment techniques involving stage-wise evaporative concentration of the brine followed by treatment of the concentrated brine with soda ash. Other brines, however, because of a higher concentration of lithium and sulfate in addition to a large concentration of magnesium and a variety of other constituents resist such treatment. Exemplary of such complex brines are the brines from the Salar de Uyuni in Bolivia, S.A., and the Salar de Atacama in Chile, S.A. A representative composition of such complex brines is set forth below in Table I.

TABLE I

| Constituent | Weight Percent |
|---|---|
| Li | 0.139 |
| Na | 8.06 |
| K | 1.84 |
| Mg | 0.98 |
| $H_3BO_3$ | 0.36 |
| $SO_4$ | 1.80 |
| Cl | 15.93 |
| $H_2O$ | 71.00 |

Notably, the lithium content of such natural brines typically is about an order of magnitude higher than brines of the Great Salt Lake and Clayton Valley.

The relative concentration of lithium to sulfate in such brines limits the extent to which the brine can be evaporatively concentrated using conventional techniques because lithium tends to precipitate out as a potassium-lithium sulfate double salt ($KLiSO_4$), at the same time a variety of other salts also precipitate, without substantially improving the concentration of lithium in the brine. The precipitate constitutes a source of lithium loss leading to a lower recovery of lithium in the brine liquor. The precipitate also represents an impurity in the mixed sulfate salts generally recovered from such brines. Normally, these sulfate salts are converted to potash fertilizer using known procedures.

As a rule of thumb, the problem of premature precipitation of lithium as a double salt from a complex brine of the type shown in Table I, i.e., a brine containing lithium, sodium, potassium, magnesium, boron, sulfate and chloride components, can be expected to some extent whenever the lithium content of the brine exceeds about 0.5% by weight and the mol ratio of lithium to sulfate in the brine is between about 0.5 and 1.7. The potassium and magnesium concentrations of the brine also influence when precipitation of the double salt will be encountered.

In U.S. Pat. No. 4,187,163 a process is disclosed, wherein a soluble sulfate salt is used as an agent to precipitate lithium sulfate monohydrate from the complex brine of the type illustrated in Table I. Initially, the brine is evaporatively concentrated to remove halite and sylvite. Then, the brine is chilled to below about 10° C. and preferably about 0° C. to precipitate Epsom salt ($MgSO_4.7H_2O$). Some sodium and potassium chloride unavoidably crystallizes with and degrades the purity of the Epsom salt.

After additional evaporation to remove potash salts (and in some cases bischofite) from the brine and to concentrate the brine to at least about 60 mols magnesium chloride per 1000 mols of water and more typically up to about 95 mols magnesium chloride per 1000 mols of water, a soluble sulfate salt is added to the concentrated brine to precipitate lithium sulfate monohydrate. The magnesium chloride content of a brine is determined by assuming that all sulfate in the brine appears as magnesium sulfate and that the remaining metal cations, magnesium included, appear as chloride salts.

Garrett and Laborde, (1980) *Salting Out Process for Lithium Recovery* also discloses that a second cooling step could be employed after the brine's additional evaporation and prior to treatment with the soluble sulfate salt to precipitate additional Epsom salt, if desired. The lithium-depleted brine then can be recycled to the first chiller or treated, for example, with a strong acid, to precipitate boric acid; while the precipitated lithium sulfate monohydrate is processed for lithium recovery.

While this process permits the recovery of lithium from a complex brine of the type illustrated in Table I, the process steps disclosed for treating the brine prior to addition of the soluble sulfate salt lead to an undesirably low recovery of lithium from the original complex brine. Typically, significant quantities of lithium are coprecipitated with the potash salts when the brine is evaporatively concentrated under normal conditions, for example, when using solar energy. The described process typically is limited to lithium recoveries on the order of about 10–15% from the original complex brine.

It is an object of the present invention to provide an improved process for recovering lithium from complex brines containing relatively high concentrations of lithium, sulfate and magnesium using the technique of common ion precipitation.

It is another object of this invention to provide a process which significantly improves the recovery of lithium from complex brines containing relatively high concentrations of lithium, sulfate and magnesium using the technique of common ion precipitation.

It is another object of this invention to provide a process for recovering lithium in high purity and yield from complex brines containing relatively high concentrations of lithium, sulfate and magnesium, wherein the bulk of the evaporative concentration can be done using solar energy.

These and other objects of this invention will become apparent to one skilled in this art from a consideration of the specification and appended claims.

SUMMARY OF THE INVENTION

The present invention relates to a process for recovering lithium from a chloride and sulfate-containing complex feed brine comprising (a) chilling said complex feed brine in a first stage down to about 10° C. but no lower than about 4° C. to precipitate potassium chloride;

(b) chilling said potassium chloride-reduced brine in a second stage in the presence of added water, to about 0° C. to precipitate Epsom salt which is recovered from the brine;

(c) evaporatively concentrating said chilled brine until it becomes substantially saturated with respect to lithium;

(d) recycling a minor amount of said evaporatively concentrated brine for mixing with said complex feed brine;

(e) chilling a major amount of said evaporatively concentrated brine in a third stage down to about 0° C. to precipitate carnallite;

(f) evaporatively concentrating said chilled brine recovered from step (e) to remove water from said brine with substantially no precipitation of solid salts therefrom;

(g) adding sufficient magnesium sulfate to the brine produced in step (f) to yield a brine slurry having a sulfate to lithium mol ratio of at least about 0.9, and a water content of less than about 60%, enough water previously having been removed from said brine by evaporation in step (f) to yield said brine slurry with said water content of less than about 60% after adding the magnesium sulfate; and (h) recovering lithium sulfate monohydrate from said brine slurry.

BRIEF DESCRIPTION OF THE DRAWING

FIG. 1 is a schematic process diagram illustrating the process of the present invention.

DETAILED DESCRIPTION OF THE INVENTION

With reference to FIG. 1, the process of the present invention will now be described. Unless otherwise indicated, all percentages reported throughout the specification and claims are by weight. The complex feed brine in line 1 is mixed in mix tank 10 with a recycle liquid stream, the source of which will be described in more detail hereafter. The recycle stream is introduced into mix tank 10 through line 25.

Typically, the complex brine fed into mix tank 10 will previously have been evaporatively concentrated, such as by solar energy, from a composition as illustrated in Table I to a magnesium chloride concentration of about 25–35 mols per 1000 mols of water, i.e., until the complex brine becomes saturated in sulfate. While the invention will be specifically described with respect to a brine of the type illustrated in Table I, those skilled in this technology will readily recognize its application to other brines as well. The present invention is not to be limited to any specific source of brine. For example, the present invention can also be used to treat brines produced as a by-product of sulfate salt recovery operations.

Normally, the brine is concentrated in two stages. In a first stage, sodium chloride is essentially the only brine constituent recovered as a precipitate. This initial region of concentration and precipitation commonly is referred to as the halite field. At a brine concentration of about 15 mols of magnesium chloride per 1000 mols of water, the brine also becomes saturated in potassium chloride and it begins to co-precipitate with the sodium chloride. The region of co-precipitation is called the sylvite field and typically extends to a magnesium chloride concentration of about 25 to 35 mols per 1000 mols of water. As will be recognized by those skilled in this art, some brines having a higher ratio of sulfate to chloride than illustrated by the brine of Table I may not have a sylvite field.

When the complex feed brine, normally a sylvite pond end brine, in line 1 is mixed with the recycle brine stream introduced through line 25 into mix tank 10, an additional portion of sodium precipitates from the mixture and is recovered in line 2 as sodium chloride.

The brine mixture recovered in line 3 from mix tank 10 then is fed to the first stage chiller 20. In first stage chiller 20, the brine is cooled down to about 10° C. and precipitated potassium chloride is recovered in line 4. The brine should not be chilled to lower than about 4° C., and preferably no lower than about 6° C., during this step of the process. Failure to chill the brine in this first step down to about 10° C. results in lower removal of potassium and a reduction in the purity of the Epsom salt recovered in the subsequent step. Excess cooling to temperatures below about 4° C. reduces the yield of Epsom salt in the subsequent chiller.

The brine recovered in line 5 then is chilled further to about 0° C. in second stage chiller 30. Enough water is added through line 6 to the brine introduced into chiller 30 so as to keep sodium and potassium salts in the brine below saturation in chiller 30. The quantity of water needed is a function of the brine composition, and can be determined by routine experimentation. As a consequence of the further chilling, a relatively high purity Epsom salt crystallizes from the chilled brine. Failure to operate chiller 30 at about 0° C. degrades both the purity and recovery of the Epsom salt product from the brine. While temperatures below 0° C. can be used in chiller 30, such operation merely requires a greater expenditure of power with no substantial improvement in either product recovery or purity.

The precipitated Epsom salt is separated from the brine in line 7 and the brine is passed through line 8 to evaporation step 40.

In evaporator 40, the brine is evaporatively concentrated. Generally, this evaporative concentration can be carried out under ambient conditions using solar ponds, although if desired, the evaporation can be done in plant evaporators. The brine is evaporatively concentrated until it substantially reaches lithium saturation, e.g., until the lithium content of the brine is at least about 90% of the brine's lithium saturation concentration. Because of the prior addition of water to the brine and the removal of Epsom salt in chiller 30, additional potassium values can be removed from the brine in line 8 without significant loss of the brine's lithium values. In other words, because of prior treatment, the brine in line 8 is below lithium saturation. During evaporation, sodium chloride and potassium chloride precipitate and are recovered in line 12.

A major fraction of the concentrated brine discharged from evaporator 40 in line 14 is passed through line 16 and again is cooled down to about 0° C. in third stage chiller 50. A minor fraction of the concentrated brine is recycled through lines 15 and 25 to mix tank 10. Recirculation of this minor portion of the concentrated brine enhances potassium removal (rejection) in first stage chiller 20. Generally, enough brine is recirculated through lines 15 and 25 so as to reduce, in connection with the above-described operations of chilling and evaporation, the mol ratio of potassium to lithium in the concentrated brine in line 14 to below about 0.35, and preferably to about 0.3 or below. Generally, in order to provide a sufficient removal of potassium from the brine the recycle flow will correspond to about 20 to 25% of the flow rate of the brine recovered in line 14 from evaporator 40.

Because of the inverse solubility characteristic of lithium sulfate, it remains in solution in third stage chiller 50 while carnallite and sodium chloride crystallize from the brine and are recovered in line 17. This crystallization causes the weight percent of water in the brine to increase, and the lithium sulfate concentration to drop slightly below saturation, even though the percent by weight of lithium in the brine has increased.

Excess water in the brine recovered in line 18 then is removed through line 19 using any procedure that does not cause salts (solids) to precipitate from the brine. Preferably, the water is removed by vacuum evaporation in evaporator 60. This evaporation is conducted at a temperature of about 45° to 60° C., and at a pressure between about 15 and 25 mm of Hg, preferably between about 18 and 22 mm of Hg. Sufficient water is removed from the brine in evaporator 60 so that the water content of the concentrated brine after addition of a soluble sulfate salt in the next step of the process is less than about 60% by weight.

Hot brine recovered from evaporator 60 is transferred through line 21 to crystallizer 70 where magnesium sulfate is added through line 11 to the brine to increase the sulfate to lithium mol ratio in the resultant mixture to at least about 0.9 and preferably to at least about 1.0. Preferably Epsom salt ($MgSO_4.7H_2O$) recovered from second stage chiller 30 is added to crystallizer 70. The addition of the magnesium sulfate, e.g., Epsom salt, to the hot brine causes the brine's temperature to drop to about 40° C. and this temperature preferably is maintained in crystallizer 70. The addition of magnesium sulfate to the brine causes lithium sulfate monohydrate to precipitate by the common ion effect. Generally, when using Epsom salt, a residence time on the order of about one hour is needed to ensure substantially complete crystallization of the lithium sulfate monohydrate.

A particular benefit of the present invention is that Epsom salt recovered from the complex feed brine can be used directly as the magnesium sulfate in crystallizer 70. While the prior art has taught such direct use, the processes disclosed in the prior art do not produce either an Epsom salt product of a sufficient purity or a brine concentrate having a composition which permits such direct use while maintaining satisfactory recovery of lithium values.

Epsom salt recovered from the complex feed brine in a single stage chiller using the process disclosed in U.S. Pat. No. 4,287,163 for example includes about 30% sodium and potassium impurities. If this Epsom salt is used directly in crystallizer 70, both the recovery and purity of the lithium sulfate monohydrate precipitated from the brine suffers. In order to maximize lithium recovery and purity, it is necessary to purify the Epsom salt recovered from such a single stage chiller in a separate purification system.

Furthermore, the prior art also has not recognized the importance of water content in crystallizer 70 on the recovery of lithium sulfate monohydrate from the brine. Applicant has discovered that by maintaining the water content of the brine slurry in crystallizer 70, i.e., after the addition of the magnesium sulfate to the brine in line 21, below about 60% by weight by previously removing sufficient water from the brine in vacuum evaporator 60, then Epsom salt can be used as the source of magnesium sulfate while maintaining adequate lithium recovery and it is not necessary to dehydrate the Epsom salt to any degree. In the specific illustrative examples in U.S. Pat. No. 4,287,163 a pure, partially dehydrated Epsom salt (only 35.5% $H_2O$) was used as the source of soluble sulfate.

Moreover, because Epsom salt is significantly more soluble in the brine than dehydrated or partially dehydrated magnesium sulfate, particularly in those cases where the magnesium sulfate salt contains other impurities, the residence time of brine in crystallizer 70 necessary for substantially complete formation of the lithium sulfate monohydrate precipitate is only about one hour. When using an impure source of magnesium sulfate that has been dehydrated or at least partially dehydrated, a brine residence time in excess of about 10 hours and often times on the order of about 24 hours is required in order to form a precipitate, as shown in the prior art. Consequently, by greatly facilitating the use of Epsom salt, produced directly in the process, as the magnesium sulfate source, the present invention constitutes an important advance in the art.

The brine slurry recovered from crystallizer 70 in line 22 is fed to filter 80 where a lithium sulfate monohydrate cake is produced and washed with water or a saturated solution of lithium sulfate. Wash solution is introduced through line 23 to displace entrainment from the filter cake. The washed solids then are passed to dryer 90 where excess water 29 is removed and the dried product 31 is recovered for further treatment as desired. Based on the complex feed brine, lithium recoveries of 55–70% are possible using this invention.

A portion of the brine recovered in line 24 from filter 80 is recycled through lines 27 and 25 for mixing with the complex feed brine in mix tank 10 while the remaining portion can be delivered through line 28 to cooler 100. On cooling, the end brine rejects additional Epsom salt and lithium sulfate monohydrate which can be recovered and/or used. For example, the precipitated Epsom salt can be recirculated through line 34 to second stage chiller 20 and/or used as an additional source of Epsom salt via line 33 in crystallizer 70. It is also possible to recover boric acid from the end brine recovered in line 35 by treating it with a concentrated acid such as sulfuric acid.

While the present invention has been specifically described in connection with the brine of Table I, it should be understood that it is applicable for treating other brines including any complex brine containing high concentrations of both lithium and sulfate at such a relative concentration that a potassium-lithium sulfate double salt unavoidably precipitates with other brine components upon normal evaporative concentration of the brine.

As noted above, the problem presented by the premature precipitation of lithium as the double salt from such complex brines can be encountered to some degree whenever the lithium content of the brine exceeds about 0.5% and the mol ratio of lithium to sulfate in the brine is between about 0.5 and 1.7. As recognized by one skilled in this technology the conditions under which precipitation of the double salt is encountered also are influenced to some degree by the type and amount of other constituents in the brine.

In a preferred embodiment of the present invention, Epsom salt precipitated from the brine during initial chilling is used as the source of magnesium sulfate. In order for a sufficient quantity of Epsom salt to be precipitated during initial brine chilling to satisfy the demand for magnesium sulfate in the process of this invention, the magnesium chloride concentration of the complex feed brine generally must exceed about 30–35 mols per 1000 mols of water.

The following example further illustrates the present invention without acting as a limitation on its scope.

EXAMPLE

A brine of the type illustrated in Table I was first evaporatively concentrated using solar energy until it reached the following composition: 1.56% sodium; 2.57% potassium; 0.66% lithium; 4.41% magnesium; 17.1% chloride; 5.18% sulfate; 1.59% boron (as borate) with the remainder being water. This concentrated brine contained about 35 mols of magnesium chloride per 1000 mols of water. This complex brine was mixed with a higher chloride-containing recycle brine stream, produced in the process as detailed below, to produce a brine mixture containing about 47 mols of magnesium chloride per 1000 mols of water.

After removing a small amount of sodium chloride, which precipitated as a consequence of mixing the higher chloride-containing recycle brine stream with the complex feed brine, the brine was cooled to 10° C. and potassium chloride was precipitated and removed from the brine. After the addition of about 1.5% water based on the chilled brine, further cooling of the brine mixture to 0° C. precipitated a relatively high purity Epsom salt. Including entrainment the Epsom salt was about 90–95% pure. About 0.14 lb. of Epsom salt was precipitated per each pound of the mixed feed brine.

The chilled brine then was evaporatively concentrated to reject potassium chloride and sodium chloride. This evaporation increased the lithium content of the brine to about 0.88%, reduced the mol ratio of potassium to lithium to about 0.3 and reduced the water content to about 64%. A small portion of this evaporative concentrated brine i.e., about 22%, was recycled for mixing with the complex feed brine while the remaining portion was subjected to a third stage of chilling down to about 0° C. Sodium chloride and carnallite were rejected as solid salts in the third stage chiller and the lithium and water contents of the brine were increased to about 0.94% and 65%, respectively.

The water content of the chilled brine was reduced by heating and vacuum evaporation so as not to precipitate any salts from the brine. The water content of the brine was lowered sufficiently so that mixing the brine with a source of magnesium sulfate, such as Epsom salt, produced a slurry having a water content below about 60%. In this case, the water content of the brine was reduced to about 61% by the vacuum evaporation. Sufficient Epsom salt (which contained about 51% $H_2O$) then was added to the brine to yield a lithium to sulfate mol ratio in the brine slurry of about 1.0. A precipitate was thereafter formed. After filtering, washing and drying the precipitated solid, a product containing about 92% lithium sulfate monohydrate was recovered. Over 76% of the lithium in the original concentrated complex feed brine was recovered in the dry product.

While the present invention has been described with respect to a preferred embodiment, it should be understood that various changes may be made without departing from the spirit and scope of the invention as particularly claimed below.

I claim:
1. A process for recovering lithium sulfate monohydrate from a chloride and sulfate-containing complex feed brine comprising:
    (a) chilling said complex feed brine in a first stage down to about 10° C. but no lower than about 4° C. to precipitate potassium chloride which is recovered from said brine;
    (b) further chilling said potassium chloride-reduced chilled brine recovered from step (a) in a second stage in the presence of added water, to about 0° C. to precipitate Epsom salt which is recovered from the brine;
    (c) evaporatively concentrating said chilled brine recovered from step (b) until the lithium content of the brine is at least about 90% by weight of the lithium saturation concentration of said brine;
    (d) recycling a portion of said evaporatively concentrated, chilled brine for mixing with said complex feed brine to yield a potassium to lithium mol ratio in said evaporatively concentrated chilled brine below about 0.35;
    (e) chilling a major amount of said evaporatively concentrated brine in a third stage down to about 0° C. to precipitate carnallite;
    (f) evaporatively concentrating said chilled brine recovered from step (e) to remove water from said brine with substantially no precipitation of solid salts therefrom;
    (g) adding a sufficient amount of magnesium sulfate to the brine produced in step (f) to yield a brine slurry having a sulfate to lithium mol ratio of at least about 0.9, and a water content of less than about 60% by weight and thereby precipitating the lithium sulfate monohydrate;
    (h) recovering the lithium sulfate monohydrate from said brine slurry.

2. The process of claim 1 wherein said added magnesium sulfate is Epsom salt ($MgSO_4 \cdot 7H_2O$).

3. The process of claim 2 wherein said Epsom salt added in step (g) includes Epsom salt recovered in step (b).

4. The process of claim 2 wherein said added water in step (b) is sufficient to keep the potassium content of said brine below saturation during said second chilling step.

5. The process of claim 4 wherein the evaporative concentration of step (f) is conducted between about 45° and 60° C. and under a subatmospheric pressure.

6. The process of claim 5 wherein the subatmospheric pressure is in the range of about 15 to about 25 mm of Hg.

* * * * *